(12) United States Patent  
Bensing

(10) Patent No.: US 11,499,304 B1
(45) Date of Patent: *Nov. 15, 2022

(54) MULTI FUNCTIONAL SPRAY FOR BIDET ATTACHMENT

(71) Applicant: Tushy, Inc., Brooklyn, NY (US)

(72) Inventor: Zachary Bensing, Brooklyn, NY (US)

(73) Assignee: Tushy, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,400

(22) Filed: Jun. 29, 2021

(51) Int. Cl.
  *E03D 9/08* (2006.01)
  *F16K 11/08* (2006.01)
  *F16K 31/60* (2006.01)

(52) U.S. Cl.
  CPC .............. *E03D 9/08* (2013.01); *F16K 11/08* (2013.01); *F16K 31/605* (2013.01)

(58) Field of Classification Search
  CPC ........................................................ E03D 9/08
  USPC ...... 4/252.1, 285, 56, 64, 643, 420.4, 420.5, 4/447–448, 420; 285/56, 64
  See application file for complete search history.

(56) References Cited

U.S. PATENT DOCUMENTS

| | | | | |
|---|---|---|---|---|
| 3,781,919 A * | 1/1974 | Ayala | ...................... | E03D 9/08 4/240 |
| 4,135,255 A * | 1/1979 | Menendez | ................ | E03D 9/08 4/448 |
| 4,700,885 A | 10/1987 | Knebel | | |
| 4,807,311 A * | 2/1989 | Ingels | ....................... | E03D 9/08 4/443 |
| 4,967,423 A * | 11/1990 | Aoyama | ................... | E03D 9/08 239/588 |
| 4,998,300 A * | 3/1991 | Sharifzadeh | ............. | E03D 9/08 4/420.4 |
| 5,022,429 A | 6/1991 | Rollini et al. | | |
| 5,361,427 A * | 11/1994 | Wilk | ...................... | E03D 9/085 4/445 |
| 5,495,625 A * | 3/1996 | McGuire | ................... | E03D 9/08 4/420.5 |
| 5,911,516 A * | 6/1999 | Chang | ....................... | E03D 9/08 4/447 |
| 6,959,731 B2 | 11/2005 | Bartkus et al. | | |
| 7,753,074 B2 | 7/2010 | Rosko et al. | | |
| 8,479,772 B2 | 7/2013 | Petrovic et al. | | |
| 9,068,332 B2 | 6/2015 | Pace | | |
| 10,378,664 B2 | 8/2019 | Choi | | |
| 10,738,454 B2 * | 8/2020 | Spankowski | ........... | E03D 11/02 |

(Continued)

*Primary Examiner* — Lori L Baker
(74) *Attorney, Agent, or Firm* — Mark Terry

(57) ABSTRACT

A bidet attachment system includes an attachment structure configured for removable attachment to a toilet bowl, a spray structure for spraying water, a rotatable dial located on a top side of the attachment structure, and a valve having an inlet section, a valve section downstream of the inlet section, the valve section regulating passage of water from the inlet section, an outlet section downstream of the valve section, wherein the outlet section includes a first outlet that allows for egress of water and a second outlet that allows for egress of water, wherein the valve section includes an adjustable control disc being mechanically coupled with the dial such that rotation of the dial rotates the control disc, the control disc having a first and a second channel bore, and a stationary disc downstream from the stationary disc having a first and a second channel bore.

20 Claims, 12 Drawing Sheets

(56) References Cited

U.S. PATENT DOCUMENTS

| | | |
|---|---|---|
| 11,193,263 B1* | 12/2021 | Bensing .................... E03D 9/08 |
| 2011/0041243 A1 | 2/2011 | Kwon |
| 2014/0259351 A1* | 9/2014 | Spankowski ........... E03D 11/14 |
| | | 4/420 |

* cited by examiner

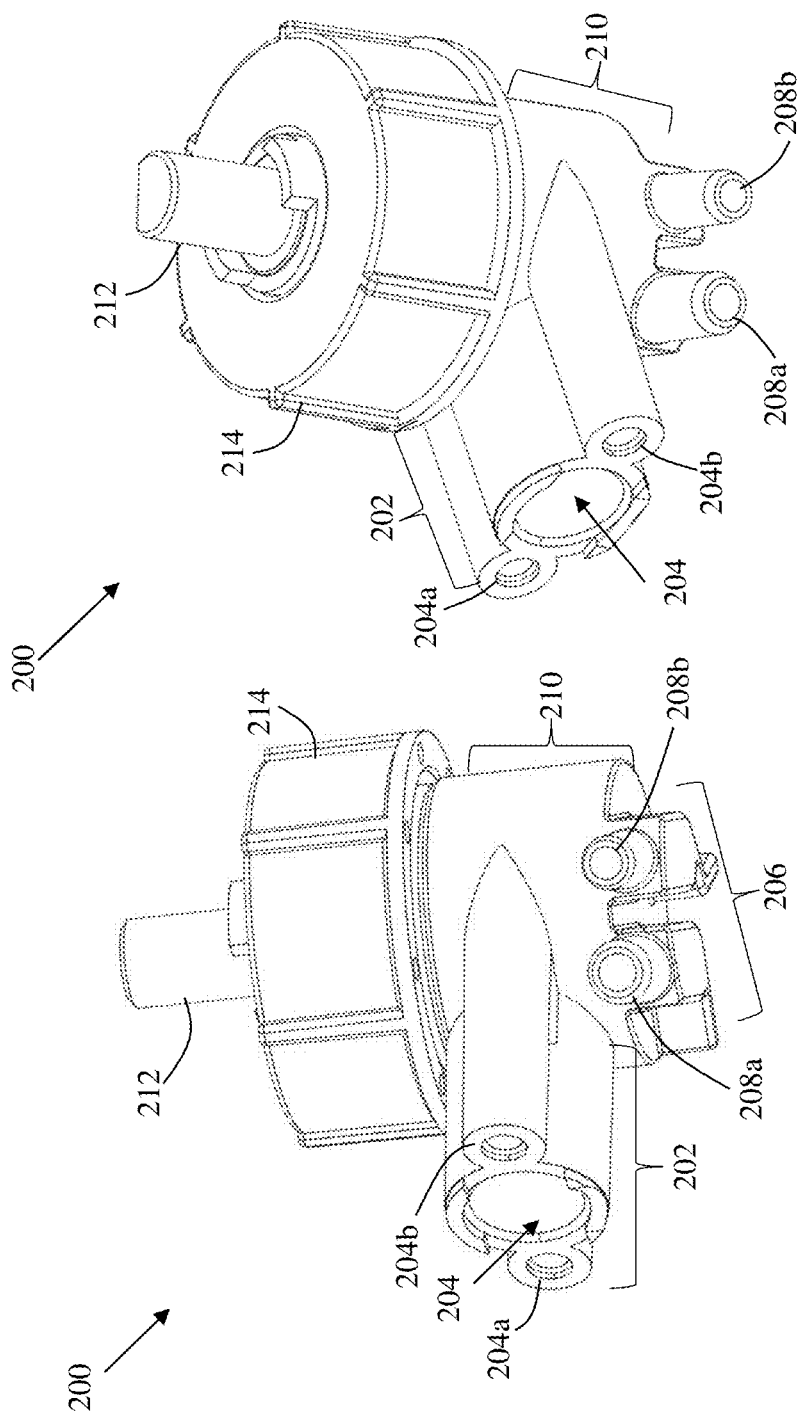

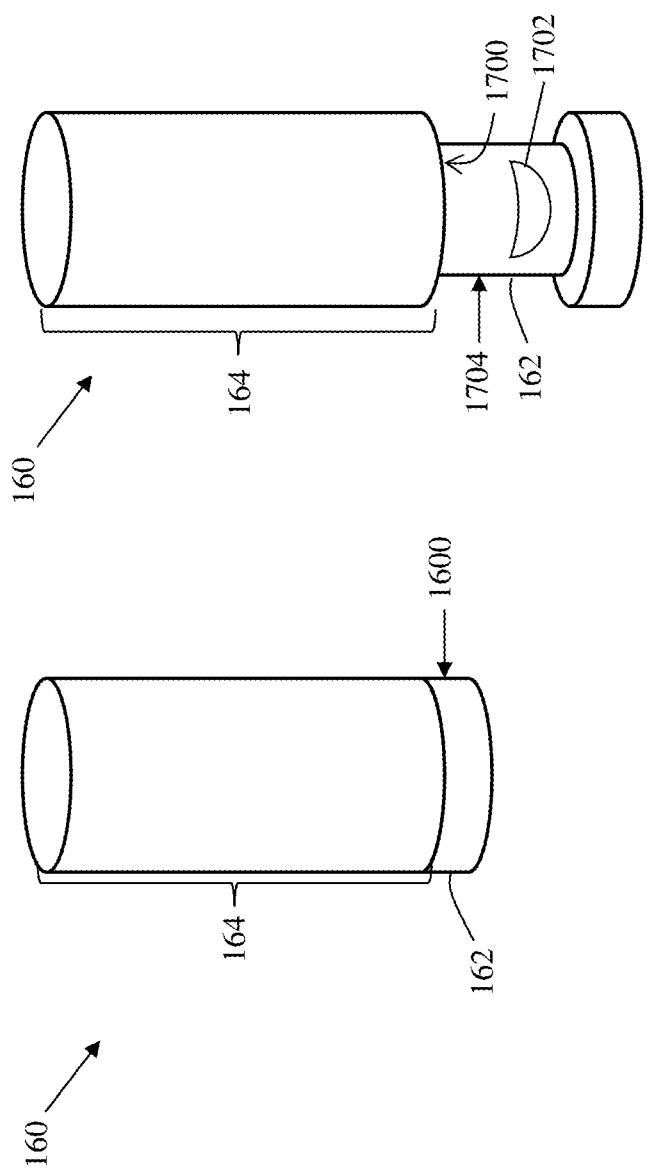

MULTI FUNCTIONAL SPRAY FOR BIDET ATTACHMENT

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to bathroom plumbing fixtures and appliances and, more specifically, to bidet attachments for toilets.

BACKGROUND

A toilet seat is a hinged unit consisting of a round or oval open seat, and usually a lid, which is bolted onto the bowl of a toilet used in a sitting position (as opposed to a squat toilet). A toilet seat consists of the seat itself, which may be contoured for the user to sit on, and the lid, which covers the toilet when it is not in use. The seat is generally lifted when a man stands to urinate, or while cleaning the toilet.

A bidet is a bowl or receptacle designed to be sat on for the purpose of washing the human genitalia, perineum, inner buttocks, and anus. The modern variety includes a plumbed-in water supply and a drainage opening and is thus a type of plumbing fixture. The bidet is designed to promote personal hygiene, and is used after defecation, and before and after sexual intercourse. There are bidets that are attachable to toilet bowls, also called "bidet attachments", or "add-on bidets". Bidet attachments may be mounted directly to the toilet and may be situated below the toilet seat. Bidet attachments may be controlled mechanically by turning a valve, which activates a jet of water. Further refinements include adjustable water pressure, temperature compensation, and directional spray control.

One of the problems associated with toilet seats and bidet attachments involves cleanliness. Bidet attachments and their parts are located near or within the toilet bowl, and therefore are exposed to urine, debris, dust and other unwanted material, which may accumulate. Further, it may be difficult to clean within nooks and crevices of a bidet attachment with a conventional sponge or brush.

Therefore, a need exists for improvements over the prior art, and, more particularly, for more efficient methods of cleaning bidet attachments.

SUMMARY

A bidet attachment system is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a bidet attachment system comprises an attachment structure configured for removable attachment to a toilet bowl; a spray structure configured for spraying water, the spray structure coupled to a bottom side of the attachment structure; a rotatable dial located on a top side of the attachment structure, the rotatable dial having a first position adjacent to a second position, and a third position adjacent to the second position; and a valve comprising: a) an inlet section that allows for ingress of water; b) a valve section downstream of the inlet section, the valve section regulating passage of water from the inlet section; c) an outlet section downstream of the valve section, wherein the outlet section includes a first outlet that allows for egress of water and a second outlet that allows for egress of water; d) wherein the valve section includes: i) an adjustable control disc being mechanically coupled with the dial such that rotation of the dial rotates the control disc, the control disc having a first channel bore and a second channel bore; and ii) a stationary disc downstream from, and in contact with, the control disc, the stationary disc having a first channel bore providing access to the first outlet and a second channel bore providing access to the second outlet, and e) wherein when the dial is in the first position, the channel bores of the control disc and stationary disc do not align, and water does not pass from the inlet section to the outlet section; f) wherein when the dial is in the second position, the first channel bore of the control disc aligns with the first channel bore of the stationary disc and water passes from the inlet section to the first outlet in the outlet section; g) wherein when the dial is in the third position, the second channel bore of the control disc aligns with the second channel bore of the stationary disc and water passes from the inlet section to the second outlet in the outlet section.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the disclosed embodiments. The embodiments illustrated herein are presently preferred, it being understood, however, that the invention is not limited to the precise arrangements and instrumentalities shown, wherein:

FIG. 2 is a bottom perspective view of a valve for a multifunctional spray, according to an example embodiment.

FIG. 3 is a top perspective view of the valve shown in FIG. 2, according to an example embodiment.

FIG. 16 is a side view of an exemplary spray structure showing the retractable spout in a retracted position, according to an example embodiment.

FIG. 17 is a side view of an exemplary spray structure showing the retractable spout in an extended position with the first and second orifices exposed for spraying water, according to an example embodiment.

DETAILED DESCRIPTION

Figure 1:
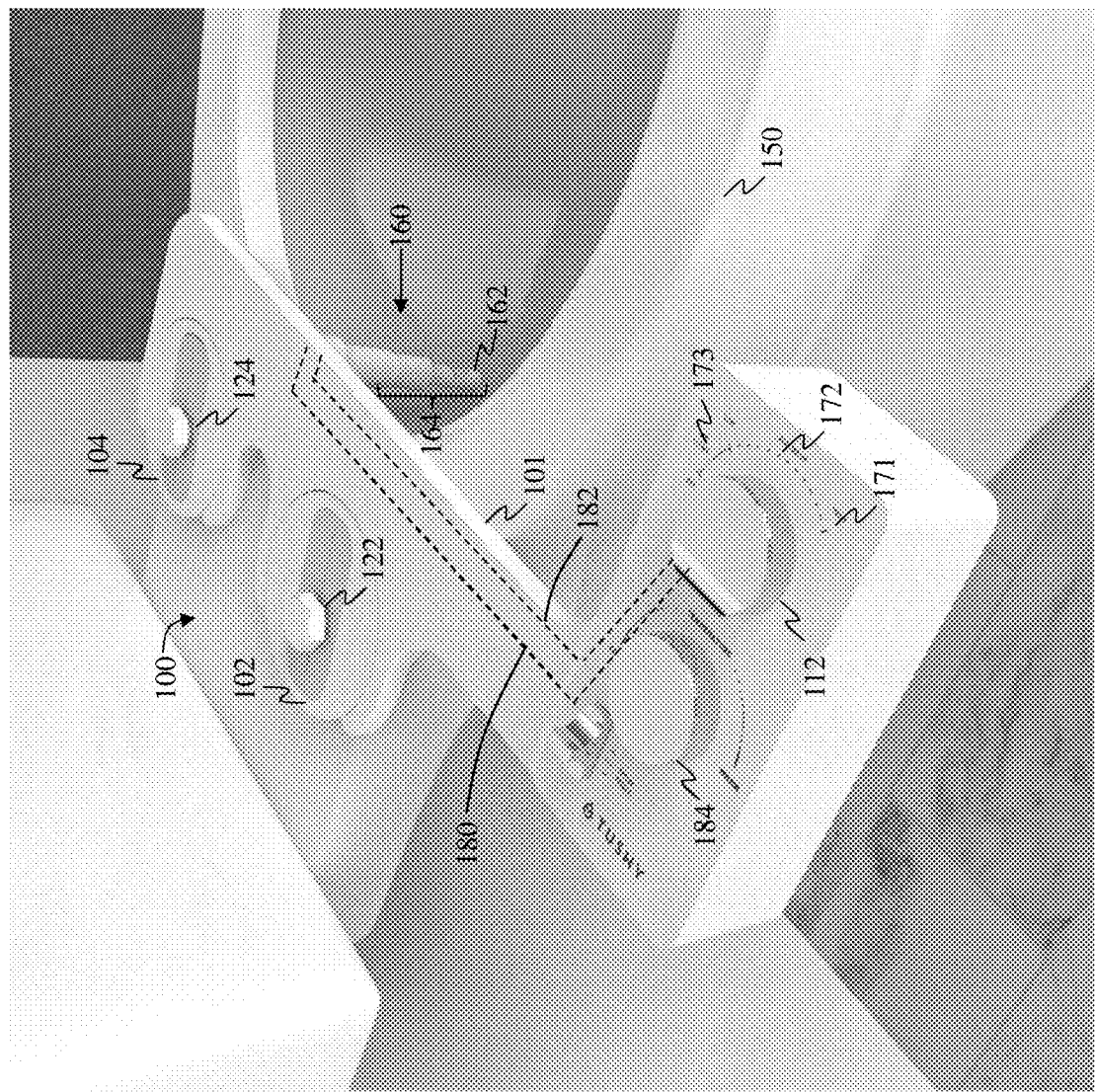
FIG. 1 is a top perspective view of a bidet attachment system including a multifunctional spray, shown attached to a toiler, according to an example embodiment.

The following detailed description refers to the accompanying drawings. Wherever possible, the same reference numbers are used in the drawings and the following description to refer to the same or similar elements. While embodiments herein may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed embodiments improve upon the prior art by providing a bidet attachment that is optimized for cleaning. Current bidet attachments are difficult to clean, especially when the spray nozzle, located within the toilet, becomes soiled or covered in dirt, feces or other unwanted material. The claimed embodiments deal with this problem using a multi-spray system that is automatically placed in a "cleaning mode" in between the "on" and "off" positions. Specifically, the claimed embodiments provide a three-way ceramic valve fixture that requires that the spray system passes the "cleaning mode" when the dial is moved from the "on" position, which activates the water spray, to the "off" position, which deactivates the water spray. Additionally, the three-way ceramic valve fixture requires that the spray system passes the "cleaning mode" when the dial is moved from the "off" position to the "on" position. Therefore, the three-way ceramic valve fixture ensures that the device enters into the "cleaning mode" whenever the device is used for cleaning a person's underside after using the toilet. While in the "on" position, water sprays from a spray nozzle with the intent of cleaning a person's underside, in the "cleaning mode" water sprays from the spray nozzle with the intent of cleaning the nozzle itself, as well as other areas of the bidet attachment and toilet.

Now referring to the figures, FIG. 1 is a perspective view of a bidet attachment system 100. Bidet attachment system, hereafter "system" is configured to both clean the genitalia and inner buttocks region of the body with a standard spray outlet; while almost simultaneously self-cleaning with a self-cleaning outlet. The system utilizes a unique three-way ceramic valve fixture to enable selection between a first "off" position to deactivate the sprayer; a second "cleaning mode" position for self-cleaning the sprayer; and a third "on" position to activate the sprayer. A rotatable dial sequentially passes through each position on the dial to power "on" and "off" the sprayer.

The self-cleaning function is possible because the three-way ceramic valve fixture requires that the rotation of the dial, and thereby the position of the sprayer, passes through the "cleaning mode" when the dial is moved from the "on" position to the "off" position. Thus, simple manual rotation of the dial actuates a sprayer for both, cleaning the body of the user, and self-cleaning the sprayer. This, in essence, creates an automated cleaning process that is activated with each operational use of the system.

Looking again at FIG. 1, system provides an attachment structure 101 that is structurally configured for secure affixing to the toilet, or specifically the rear upper wall of the toilet bowl. The attachment structure is configured for both, removable attachment, and adjustable positioning, to the rear wall of toilet bowl.

In some embodiments, the attachment structure comprises a planar element configured for removable attachment to the rear wall of the toilet bowl via one or more fasteners. The planar element may include a rigid, flat plate that extends the width of the rear wall of the toilet bowl. Those skilled in the art will recognize that the rear wall of a toilet bowl includes multiple fastening holes that receive fasteners for hingedly fastening the toilet seat to the toilet bowl.

The planar element of the attachment structure 101 is configured with correlating fastening holes that align with the toilet fastening holes. Once aligned, a pair of bidet attachment fasteners 102, 104 are utilized to pass through both sets of fastening holes. The bidet attachment fasteners 102, 104 are configured to affix with various fastening mechanisms known in the art, such as nuts, washers, bolts, magnets, and cables. For example, a screw passes through the top side of the fastening holes in the planar element, while a nut rotatably couples to the screw from the bottom side of the fastening holes in the rear wall of the toilet bowl.

FIG. 1 shows the bidet attachment fasteners 102, 104 on the bidet attachment structure 101, used to secure the system 100 to a conventional toilet 150. As illustrated, a bolt 122 extends through the bidet attachment fastener 102 to attach the bidet attachment structure 101 to the toilet 150. FIG. 1 also shows that a bolt 124 extends through the bidet attachment fastener 104 to attach the bidet attachment structure 101 to the toilet 150.

Each fastener 102, 104 is located within a circular depression in the bidet attachment structure 101. Each fastener 102, 104 may be rotated within the circular depression in the bidet attachment 110, so as to vary the orientation of the slots (in each fastener) in relation to each other. As the orientation of the slots is varied, so is the distance between the slots, and the locus of possible positions of the bolts within the slots.

This feature allows for the placement of the bidet attachment structure 101 on toilets with bolt holes at different distances from one another, at different distances from the bowl of the toilet, and at different distances from the tank of the toilet. Each portion of the bidet attachment fasteners is further disclosed in the additional accompanying drawings and discussed in further detail below.

As discussed above, the spray structure 160 has a dual function of cleaning the genitalia and inner buttocks region of the body, and self-cleaning. For controlling these functions, the system includes a rotatable dial that is located on a top side of the attachment structure. The rotatable dial has a first position adjacent to a second position, and a third position adjacent to the second position. Rotatable displacement of the dial in two directions may incrementally select each position. FIG. 1 illustrates the rotatable dial 112, showing the first position 171; the second position 172 adjacent to the first position 171, and the third position 173 adjacent to the second position 172.

In one possible embodiment, the first position 171 is configured to deactivate, or turn "off" the discharge of water from a spray structure 160, discussed below. The adjacent second position 172 provides the function of a "cleaning mode", in which the spray structure 160 self-cleans. The third position 173, which is adjacent to the second position 172, provides the "on" function, which serves the primary purpose of forcibly discharging water from the spray structure 160 towards the genitalia and inner buttocks region of the body. The rotatable dial, when rotated, sequentially passes through each position 171, 172, 173 to power "on" and "off" the spray structure 160.

Significantly, the rotatable dial 112 must pass through the second position 172, i.e., the "self-cleaning" position, in order to reach either the first or second positions 171, 173. This, in essence, creates an automated self-cleaning function that is activated with each operational use of the system 100. The self-cleaning position is inherently activated whether the spray structure 160 is turned to the first "off", or third "on" positions 171, 173.

It is known in the art that user-controlled regulation of water temperature can be advantageous for washing the sensitive genitalia and inner buttocks regions of the body. Thus, in an alternative embodiment, a temperature dial 184 regulates the temperature of the water through similar rotational manipulation as the rotatable dial 112 described above. The temperature dial 184 can be continuously controlled to achieve hot water, warm water, and cold water while using the toilet.

In operational communication with the rotatable dial, is a valve 200. The valve 200 is the mechanism used for selective discharge of the water for self-cleaning the spray structure 160, and cleaning the genitalia and inner buttocks region of the body. This is accomplished through selective dial rotation between the first, second, and third positions 171, 172, 173. As shown in FIG. 2, the valve 200 comprises an inlet section or water attachment structure 202 that allows for ingress of water into the valve. The inlet section 202 may an inlet port 204 that is configured to receive an external source of water. The inlet section or water attachment structure 202 may include multiple screw holes 204a, 204b that are configured to receive a screw or bolt to affix a tube or tubes to the inlet section 200.

Opposing the inlet section 202, the valve comprises an outlet section 206 located downstream of the inlet section 202. The outlet section 206 includes a first outlet and a second outlet that allow for egress of water received from the inlet section 202. In one embodiment, the outlet section 206 includes multiple outlet ports 208a-b that are configured to discharge the water into a pair of tubes 180, 182 towards a spray structure 160, discussed above. In this manner, the valve is in fluid communication with the spray structure 160 via tubes 180, 182. The use of two separate outlet ports 208a-b is effective for the egress of water through separate tubes 180, 182 to the spray structure 160 for two different purposes: self-cleaning and cleaning a user's body.

Figure 4:
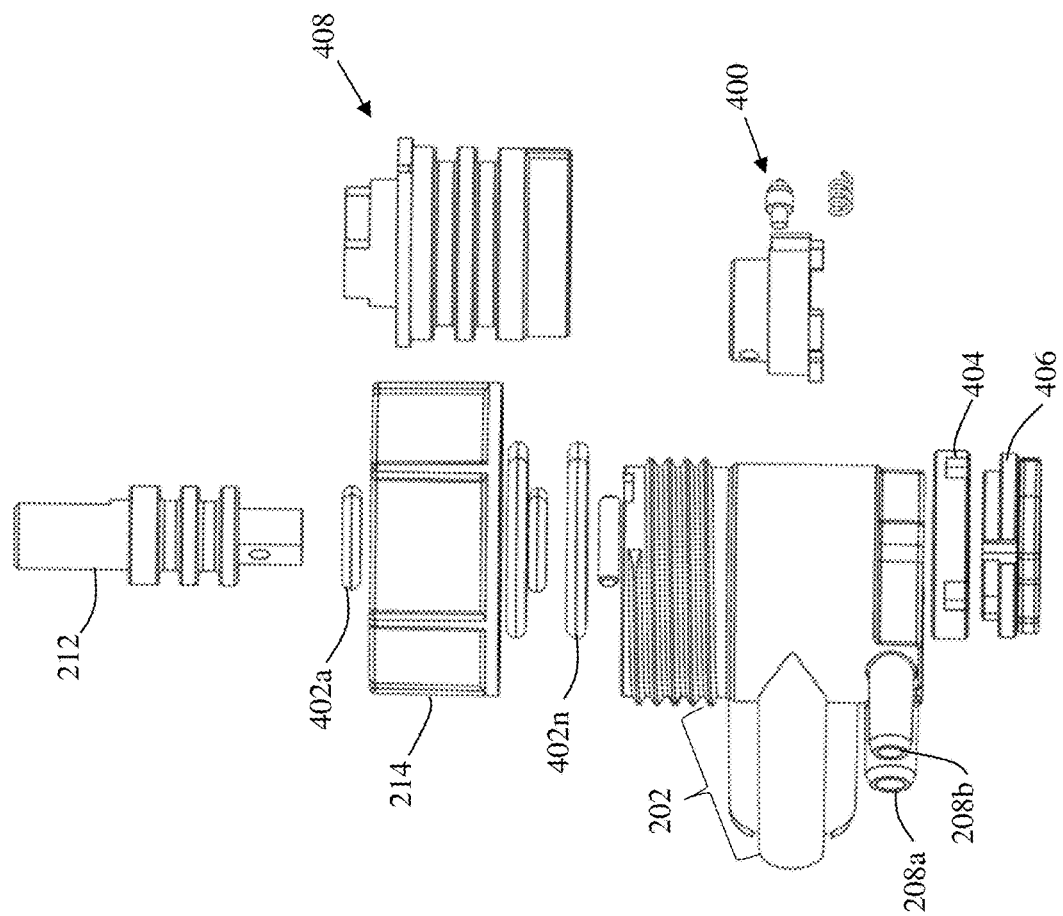
FIG. 4 is an exploded side view of the valve shown in FIG. 2, according to an example embodiment.

Turning now to FIG. 4, the valve also comprises a valve section 210 that is downstream of the inlet section 202, and upstream of the outlet section 206. The valve section 210 is configured to regulate flow rate of the water from the inlet section 202 to the outlet section 206. In an alternative embodiment, the valve section 210 comprises a check valve 400 to help prevent backflow of the water. In yet another embodiment, multiple rubber gaskets 402a-n work to seal components inside the valve section 210 to prevent water leakage. Other standard valve components 408 may also be used for operation of valve section 210.

Figure 5:
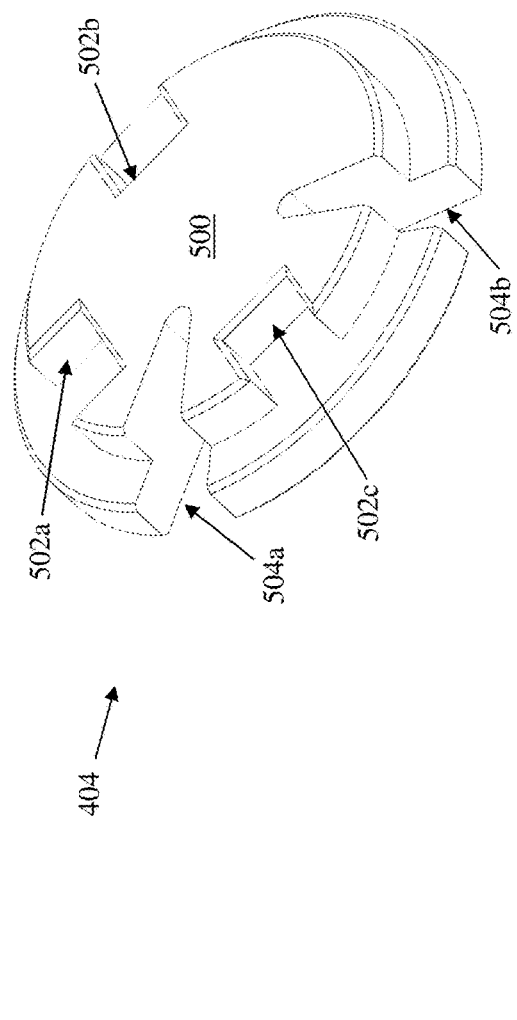
FIG. 5 is a top perspective view of an exemplary adjustment control disc for a valve for a multifunctional spray, according to an example embodiment.

In another possible embodiment, shown in FIG. 5, the valve section 210 includes an adjustable control disc 404 and a stationary disc 406 that rotatably interact through mechanical coupling with the rotatable dial 112. In one embodiment, a coupling tube 212 and a rotatable collar 214 enable secure coupling therebetween. This mechanical coupling enables rotation of the dial 112 to cause a corresponding rotation of the control disc 404, in relation to the stationary disc 406. As discussed above, the dial 112 is mechanically coupled with the control disc 404, such that rotation of the dial 112 rotates the adjustable control disc 404. The rotation of the control disc 404 can be correlated to the three positions of the dial 112, as discussed above. Thus, the control disc 404 proportionally rotates in response to rotation of the dial 112.

Figure 6:
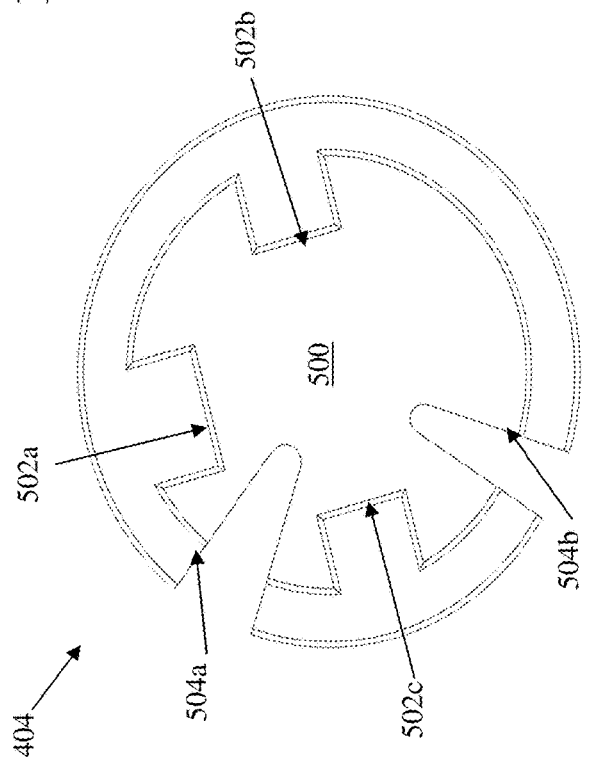
FIG. 6 is a top view of the control disc shown in FIG. 5, according to an example embodiment.

In one possible embodiment, the mechanical coupling between the control disc 404 and the dial 112 may be possible through use of multiple notches 502a-c on the outer face 500 of the control disc 404 (see FIG. 6). The notches 502a-c are sized and dimensioned to receive an interlocking member connected to the dial 112. The interlocking member may be a rod with corresponding protrusions that mate with the notches 502a-c. However, in other embodiments, any mechanical interconnection between the rotating dial 112 and the control disc 404 may be used, as is known in the art.

Thus, as the dial 112 rotates between the first, second, and third positions 171, 172, 173, in either clockwise or counterclockwise directions; the control disc 404 rotates in the same direction, and at a proportional rotation angle. For example, when the dial 112 rotates from the first position 1200 to the second position 1300, the control disc 404 rotates a corresponding distance and rotation angle. As discussed below, the control disc 404 rotates to align and misalign channel bores 504a-b with corresponding channel bores 800a-b in the stationary disc 406. This selective alignment of channel bores 504a-b, 800a-b and outlet ports 208a-b is determinative of the function by the spray structure 160.

Figure 7:
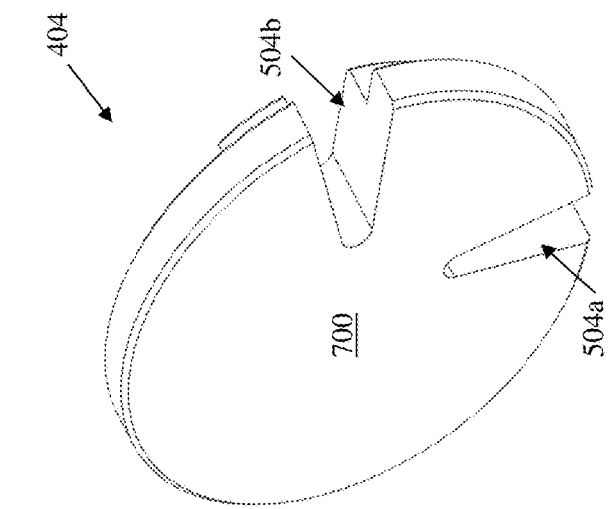
FIG. 7 is a bottom perspective view of the control disc shown in FIG. 5, according to an example embodiment.
Figure 8:
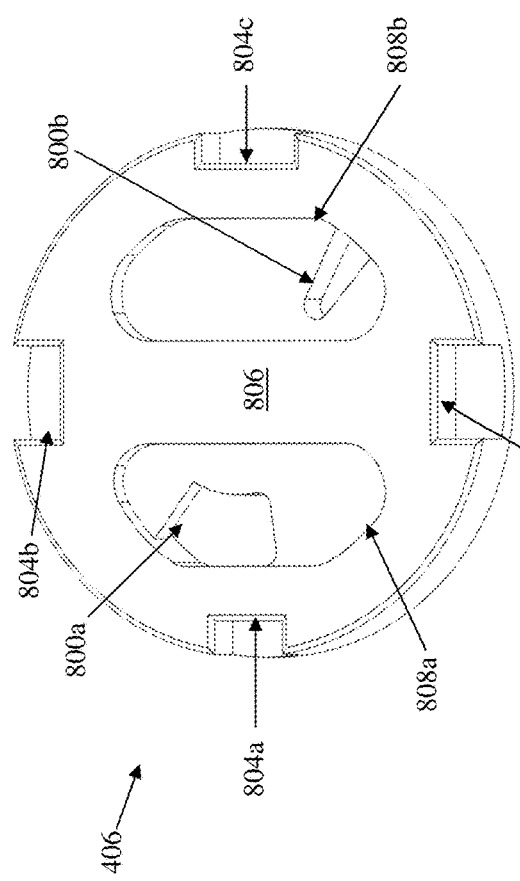
FIG. 8 is a top perspective view of an exemplary stationary disc for a valve for a multifunctional spray, according to an example embodiment.

As shown in FIG. 7, the control disc 404 defines a first channel bore 504a and a second channel bore 504b that are sized and dimensioned to enable passage of water through the outlet section 206 of valve. The first and second channel bores 504a-b are configured to enable passage of the water from the inlet section 202 of the valve. FIG. 8 references two channel bores 504a-b for the control disc 404 that correspond to the inlet 204 and two outlet ports 208a-b in the valve section 210. Though the first and second channel bores 504a-b have similar shapes and dimensions, the channel bores 504a-b are in a spaced-apart relationship.

In one embodiment, the first channel bore 504a enables passage of water for self-cleaning the spray structure through a first orifice 1700 in the spray structure 160, discussed below. In other embodiments, the second channel bore 504b enables passage of water for cleaning the genitalia and inner buttocks region of the body through a second orifice 1702 in the spray structure 160, discussed below. Thus, through rotatable manipulation of the dial 112 between first and third positions 171, 172, 173, the desired channel bore hole 504a-b, 800a-b can be controlled to enable passage of water for different functions.

Turning now to FIG. 8, the valve section 210 also comprises a stationary disc 406 that is located downstream from the control disc 404. In one embodiment, the stationary disc 406 is disposed in an adjacent, parallel relationship with the control disc 404. Further, the stationary disc 406 is fixed, in relation to the rotatable control disc 404. The stationary disc 406 works in conjunction with the adjustable control disc 404 to regulate the flow of water through the outlet section 206 of the valve.

Figure 10:
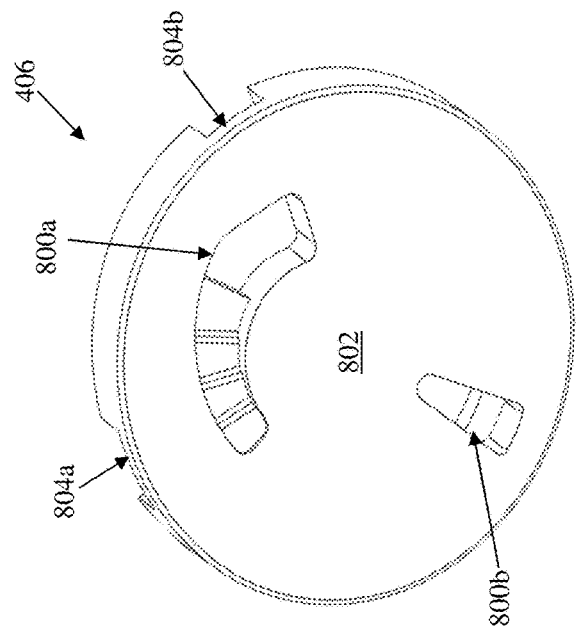
FIG. 10 is a bottom perspective view of the stationary disc shown in FIG. 8, according to an example embodiment.
Figure 9:
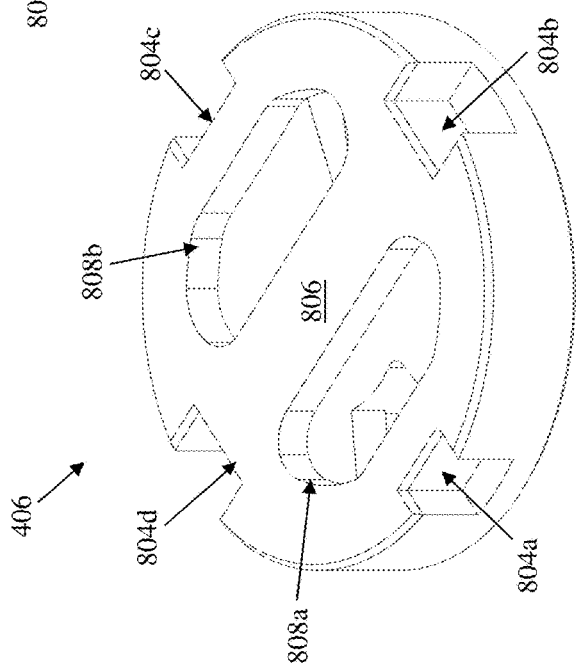
FIG. 9 is a top view of the stationary disc shown in FIG. 8, according to an example embodiment.

As FIG. 9 shows, the stationary disc 406 has an outer face 802 and an inner face 806. The inner face 806 has a pair of passageways 808a, 808b. The inner face 806 engages the inner face 700 of the control disc 404. In one possible embodiment, spaced-apart notches 804a-d form along the perimeter of the stationary disc 406 to help align and mate the discs 404, 406 together. The outer face 802 defines a first channel bore 800a, and an adjacent second channel bore 800b. Similar to the control disc channel bores 504a-b, the channel bores 800a-b formed in the stationary disc 406 are configured to enable passage of the water from the inlet section 202 to the outlet section 206 of the valve 200. In one embodiment, the channel bores 800a-b define an elongated oval slot and a triangular opening that forms near the outer face 802 of the stationary disc 406 (FIG. 10).

In one possible embodiment, the first channel bore 800a provides access to the first outlet port 208a of the outlet section 206 for the valve section 210. When water discharges from the first port 208a, the water discharge from a first orifice 1700 self-cleans the spray structure 160. In another embodiment, the second channel bore 800b of the stationary disc 406 provides access to the second outlet port 208b of the outlet section 206 for the valve section 210. When water discharges from the second outlet port 208b, the spray structure 160 discharges water from the second orifice 1702 to clean the body.

Thus, the second channel bore 800b provides access to the second outlet port 208b of the outlet section 206 for the valve section 210. When water discharges from the second outlet port 208b, the discharge is from a second orifice 1702 in the spray structure 160, which cleans the genitalia and inner buttocks region of the body. In this manner, when the channel bores 504a-b, 800a-b for the control disc 404 and the stationary disc 406 align, water can pass through for cleaning the body, or self-cleaning the spray structure, depending on the position of the dial 112, which controls which outlet ports 208a-b the water passes through.

In one embodiment, the first channel bore 800a enables passage of water for self-cleaning the spray structure through a first orifice 1700 in the spray structure 160, discussed below. In other embodiments, the second channel bore 800b enables passage of water for cleaning the genitalia and inner buttocks region of the body through a second orifice 1702 in the spray structure 160, discussed below. Thus, through rotatable manipulation of the dial 112 between first and third positions 171, 173, the desired channel bore 504a-b, 800a-b can be controlled to enable passage of water for different functions.

Figures 11, 12, 13, 14, 15:
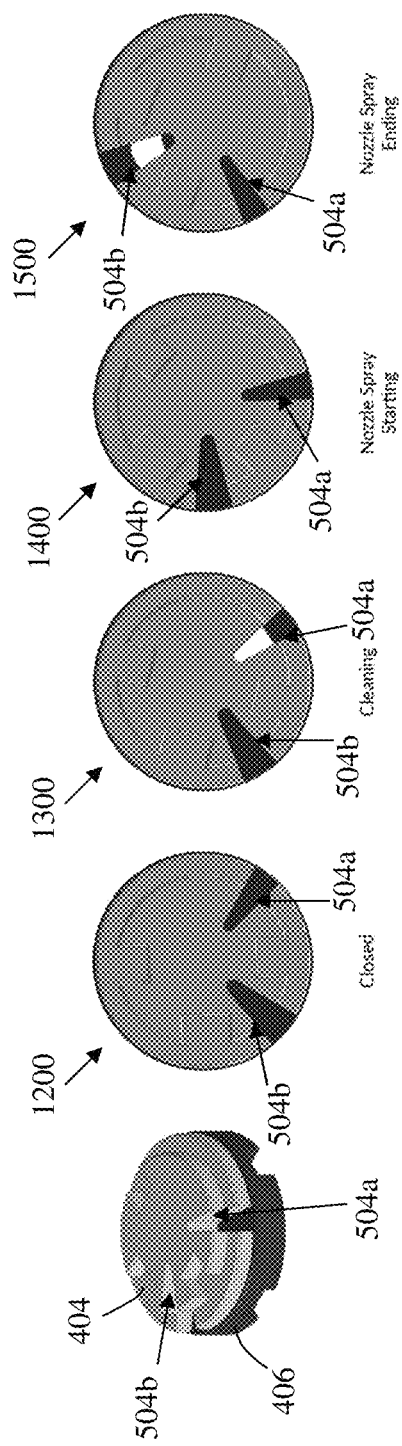
FIG. 11 is a perspective view of a control disc joined with a stationary disc, according to an example embodiment.
FIG. 12 is a top view of the control disc and the disc disposed in a first position, according to an example embodiment.
FIG. 13 is a top view of the control disc and the disc disposed in a second position, according to an example embodiment.
FIG. 14 is a top view of the control disc and the disc rotating to the third position, according to an example embodiment.
FIG. 15 is a top view of the control disc and the disc disposed in a third position, according to an example embodiment.

Turning now to FIG. 11, the control disc 404 and the stationary disc 406 are arranged in a parallel relationship, with the control disc 404 rotatable in relation to the stationary disc 406. The channel bores for the discs 404, 406 may be aligned to enable passage of water through the outlet section 206 of the valve 200, or misaligned to restrict passage of the water. The relative positioning of the control disc 404 to the stationary disc 406 is controlled by the dial 112, which is rotatable between three positions 171, 172, 173. In this manner, the channel bores 500a-b for the control disc 404 rotate to one of the three positions 1200, 1300, 1500 to either align, or misalign with the channel bores for the stationary disc 406.

As shown in FIG. 12, when the dial 112 is in the first position 1200, the channel bores of the control disc 404 and stationary disc 406 do not align, and water does not pass from the inlet section 202 to the outlet section 206. This is the "off", or first position. And when the dial 112 is rotated to the second position 1300, the first channel bore 504a of the control disc 404 aligns with the first channel bore 800a of the stationary disc 406. This alignment of channel bores 504a, 800a enables water to pass from the inlet section 202 through the first outlet in the outlet section 206 (see FIG. 13).

Water is then discharged from the first orifice 1700 of the spray structure 160 to self-clean the spray structure 160. In one non-limiting embodiment, the rotation from the first position 1200 to the second position 1300 is in a clockwise direction. However, the discs 404, 406 may be configured, such that a counter-clockwise rotation of the dial 112 moves the discs from the first position 1200 to the second position 1300.

During rotation of the dial 112 to the third position 173, the bore channels misalign again, and the passageway for the water is temporarily closed between positions (FIG. 14). Continuing with the rotation of the dial 112, when the dial 112 reaches the third position 173, the second channel bore 504b of the control disc 404 aligns with the second channel bore 800b of the stationary disc 406. The third position 1500 of the discs 404, 406 is illustrated in FIG. 15. This creates an open passageway that enables water to pass from the inlet section 202 to the second outlet port 208b in the outlet section 206. Water is then discharged from the second orifice 1702 of the spray structure 160 to clean the genitalia and inner buttocks.

Looking again at FIG. 1, the system 100 comprises a spray structure 160, which serves as the terminal discharge mechanism for forcibly discharging the water to both self-clean the sprayer and clean the genitalia and inner buttocks. The spray structure 160 is in fluid communication with the outlet section 206 of the valve 200 via tube 180, 182.

The spray structure 160, necessitating proximity to the genitalia and inner buttocks region, couples to a bottom side of the attachment structure 101. This position can be inside the toilet rim. Generally speaking, the liquid discharged from the spray structure 160 is, but not limited to, pure water. However, some healthy additives may be added in the pure water for rinsing anus, and vaginal areas of the body, for example.

For discharging the water, the spray structure 160 comprises a protrusion 164. The protrusion 164 is configured to couple to the bottom side of the attachment structure 101. In this arrangement, when the attachment structure 101 is removably attached to the toilet bowl, the protrusion 164 is located within the toilet bowl. In some embodiments, the protrusion 164 may be a cylindrical structure within which is located a retractable spout 162. The retractable spout 162 extends and retracts, depending on the flowage of water therethrough.

In one embodiment, the retractable spout 162 is spring-loaded, biasing to a retracted, non-operational position 1600 that restricts passage of water from the outlet section 206. As FIG. 16 shows, the retractable spout 162 is in a retracted position 1600 when water is restricted from passing from the inlet section 202 to the outlet section 206. This is the case when the dial 112 is turned to the first position 1200 (see FIG. 12).

However, as water passes from the inlet section 202 to the outlet section 206, the pressure from the water extends the retractable spout 162 to an operational extended position 1704 for discharging the water. For example, FIG. 17 illustrates spray structure 160, showing the retractable spout 162 in an extended position 1704 with the first and second orifices 1700, 1702 exposed for spraying water.

As illustrated, the retractable spout 162 also defines a first orifice 1700 and a second orifice 1702. The orifices 1700, 1702 may define round or rectangular openings that are sized to discharge water emanating from the valve 200. In one non-limiting embodiment, the orifices 1700, 1702 may have sloped edges to direct the water downwardly for self-cleaning or cleaning the body.

The first orifice 1700 is disposed in shaft 164 above the second orifice 1702 and configured to discharge water downwardly onto the entire spray structure 160. In this configuration, the first orifice 1700 is operable to self-clean the spray structure 160. The first orifice 1700 is in fluid communication, or communicably coupled, with the first outlet port 208a that forms in the outlet section 206 of the valve 200 via a tube. The first orifice 1700 is configured to forcibly discharge water as the water passes from the inlet section 202 to the first outlet port 208a in the outlet section 206 of the valve 200. The first orifice 1700 may be a plurality of orifices.

When water discharges from the first orifice 1700, the angle of the discharge is downward, towards the second orifice 1702. This serves to self-clean the spray structure 160, as water discharged from the first orifice 1700 substantially immerses the retractable spout 162, including the second orifice 1702 used for cleaning the body.

Additionally, the second orifice 1702 forms at the terminus of the retractable spout 162, discharging water in a direction perpendicular to the protrusion 164 or diagonally upwards toward the user's buttocks. In other embodiments, the second orifice 1702 may have a slight upward spray angle so as to reach between skin folds and cervices in the body. The second outlet port 208b in the outlet section 206 is communicably coupled with the second orifice 1702 in the retractable spout 162 via a tube.

Thus, as water discharges from the second orifice 1702, water is guided towards the genitalia and inner buttocks region for cleaning thereof. The retractable spout 162 defines a second orifice 1702 that sprays water when the water passes from the inlet section 202 to the second outlet port 208b in the outlet section 206 of valve 200. Consequently, if the dial 112 selects water to pass through the first outlet port 208a, the discharged water passes through a first orifice 1700 for self-cleaning. And if the dial 112 selects water to pass through the second outlet port 208b, the discharged water passes through a second orifice 1702 for cleaning the body.

In conclusion, the system 100 includes an attachment structure 101 configured for removable attachment to a toilet bowl, a spray structure 160 for spraying water, a rotatable dial 112 located on a top side of the attachment structure 101, and a valve 200 having an inlet section 202, a valve section 210 downstream of the inlet section 202, and an outlet section 206. the valve section 210 regulates passage of water from the inlet section 202 to the outlet section 206 for subsequent discharge from the spray structure 160.

The outlet section 206 includes a first outlet port 208a that allows for egress of water and a second outlet port 208b that allows for egress of water. An adjustable control disc 404 is mechanically coupled with a dial 112, such that rotation of the dial 112 rotates the control disc 404. The control disc 404 has a pair of adjacent channel bores 504a-b that enable passage of water.

A stationary disc 406, located downstream from the control disc 404, has a pair of channel bores 800a-b that align with the control disc 404 to enable passage of water, or misalign to restrict passage of water therethrough. If the dial 112 selects water to pass through the first outlet port 208a, the discharged water passes through a first orifice 1700 for self-cleaning. If the dial 112 selects water to pass through the second outlet port 208b, the discharged water passes through a second orifice 1702 for cleaning the body.

Figure 19:
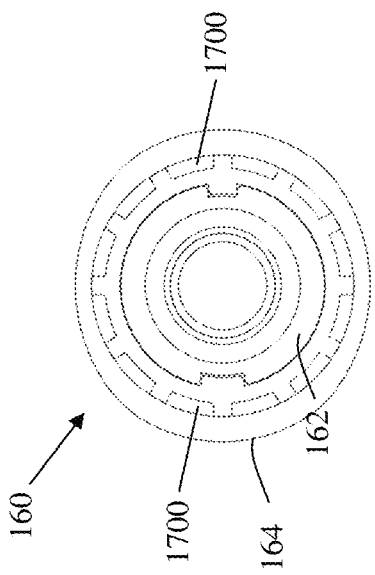
FIG. 19 is a cross sectional view of an exemplary spray structure showing the retractable spout in a retracted position, according to an example embodiment.
Figure 18:
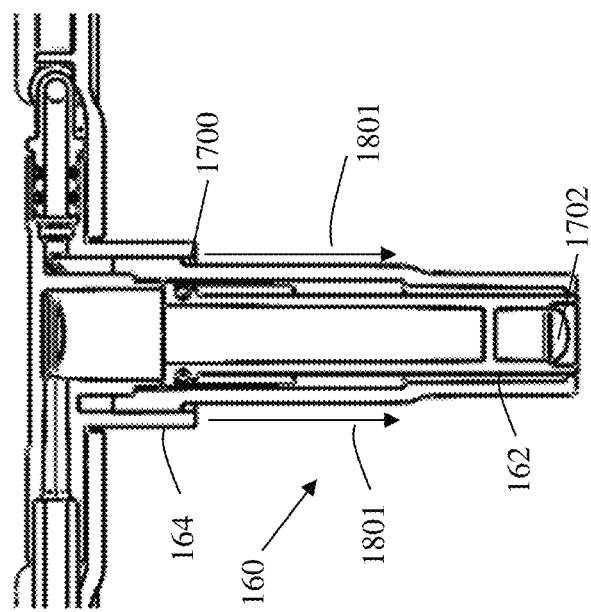
FIG. 18 is a cross sectional side view of an exemplary spray structure showing the retractable spout in a retracted position, according to an example embodiment.

FIG. 18 is a cross sectional side view of an exemplary spray structure 160 showing the retractable spout 162 in a retracted position, according to an example embodiment. FIG. 18 shows a cross section along a coronal, frontal or vertical plane. FIG. 19 is a cross sectional view of an exemplary spray structure 160 showing the retractable spout 162 in a retracted position, according to an example embodiment. FIG. 18 shows a cross section along a horizontal or transverse plane. FIGS. 18 and 19 shows that when water discharges from the plurality of orifices 1700, the angle of the discharge is downward (see arrows 1801), towards the second orifice 1702. This serves to self-clean the spray structure 160, as water discharged from orifices 1700 substantially immerses the retractable spout 162, including the second orifice 1702 used for cleaning the body. FIG. 19 shows that the plurality of orifices 1700 are located in a circular arrangement around a circumference of the structure 164. This enables water discharged from the plurality of orifices 1700 to substantially immerses the entire circumference of the retractable spout 162 for cleaning purposes.

Figure 20:
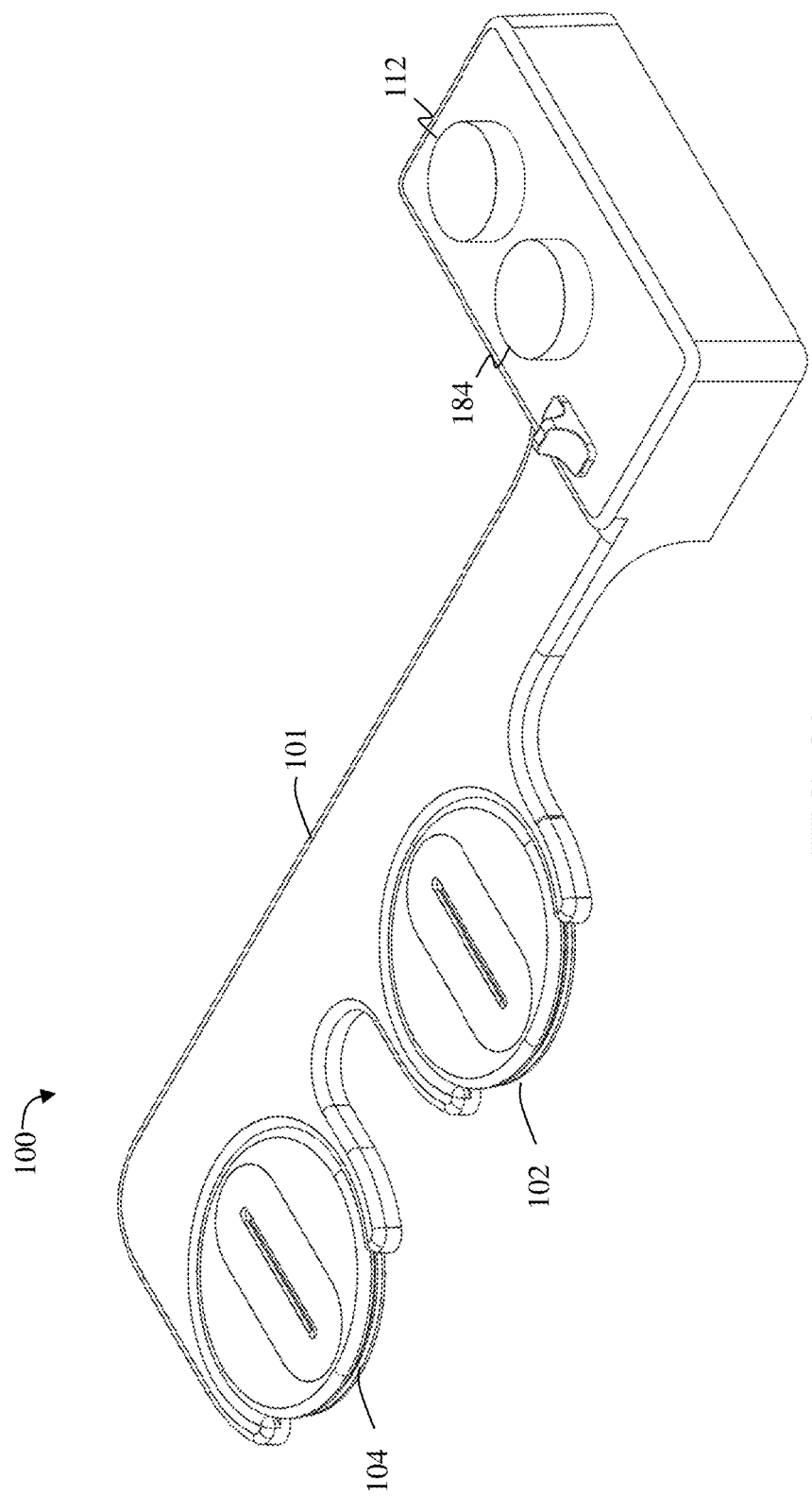
FIG. 20 is a top perspective view of a bidet attachment system including a multifunctional spray, according to an example embodiment.
Figure 21:
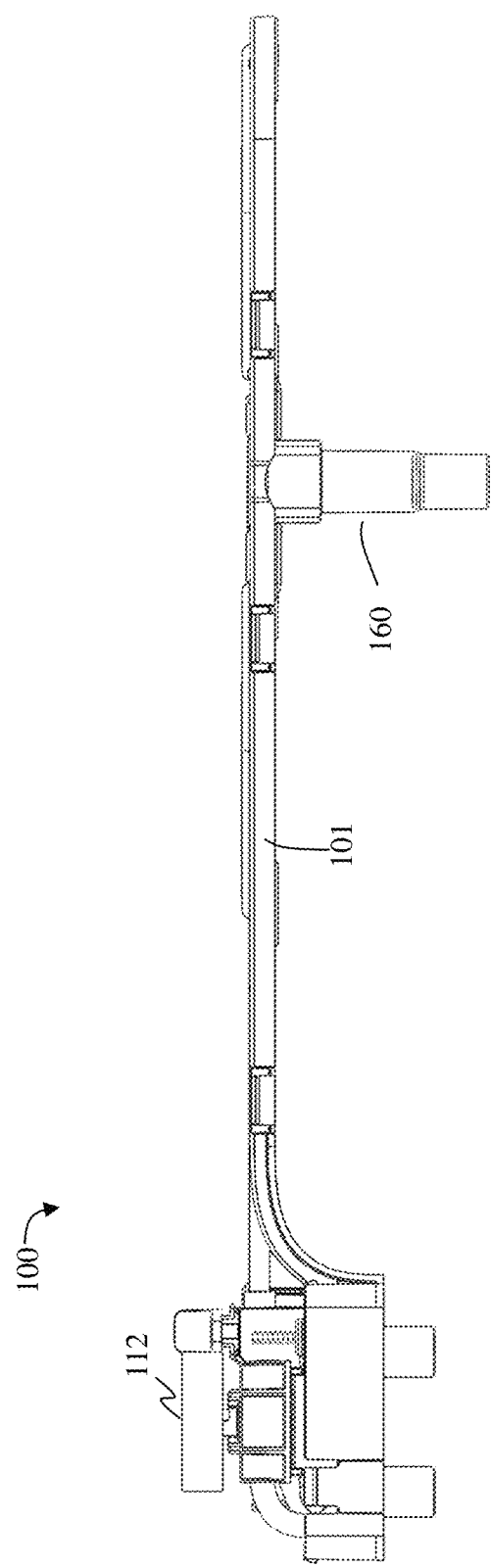
FIG. 21 is a front view of a bidet attachment system including a multifunctional spray, according to an example embodiment.

FIG. 20 is a top perspective view, and FIG. 21 is a front view, of a bidet attachment system 100 including a multifunctional spray, according to an example embodiment. FIG. 20 shows the bidet attachment fasteners 102, 104 on the bidet attachment structure 101, used to secure the system 100 to a conventional toilet. As illustrated, a bolt extends through the bidet attachment fastener 102 to attach the bidet attachment structure 101 to the toilet and a bolt extends through the bidet attachment fastener 104 to attach the bidet attachment structure 101 to the toilet. Each fastener 102, 104 is located within a circular depression in the bidet attachment structure 101. Each fastener 102, 104 may be rotated within the circular depression in the bidet attachment 110, so as to vary the orientation of the slots (in each fastener) in relation to each other. As the orientation of the slots is varied, so is the distance between the slots, and the locus of possible positions of the bolts within the slots.

Figure 22:
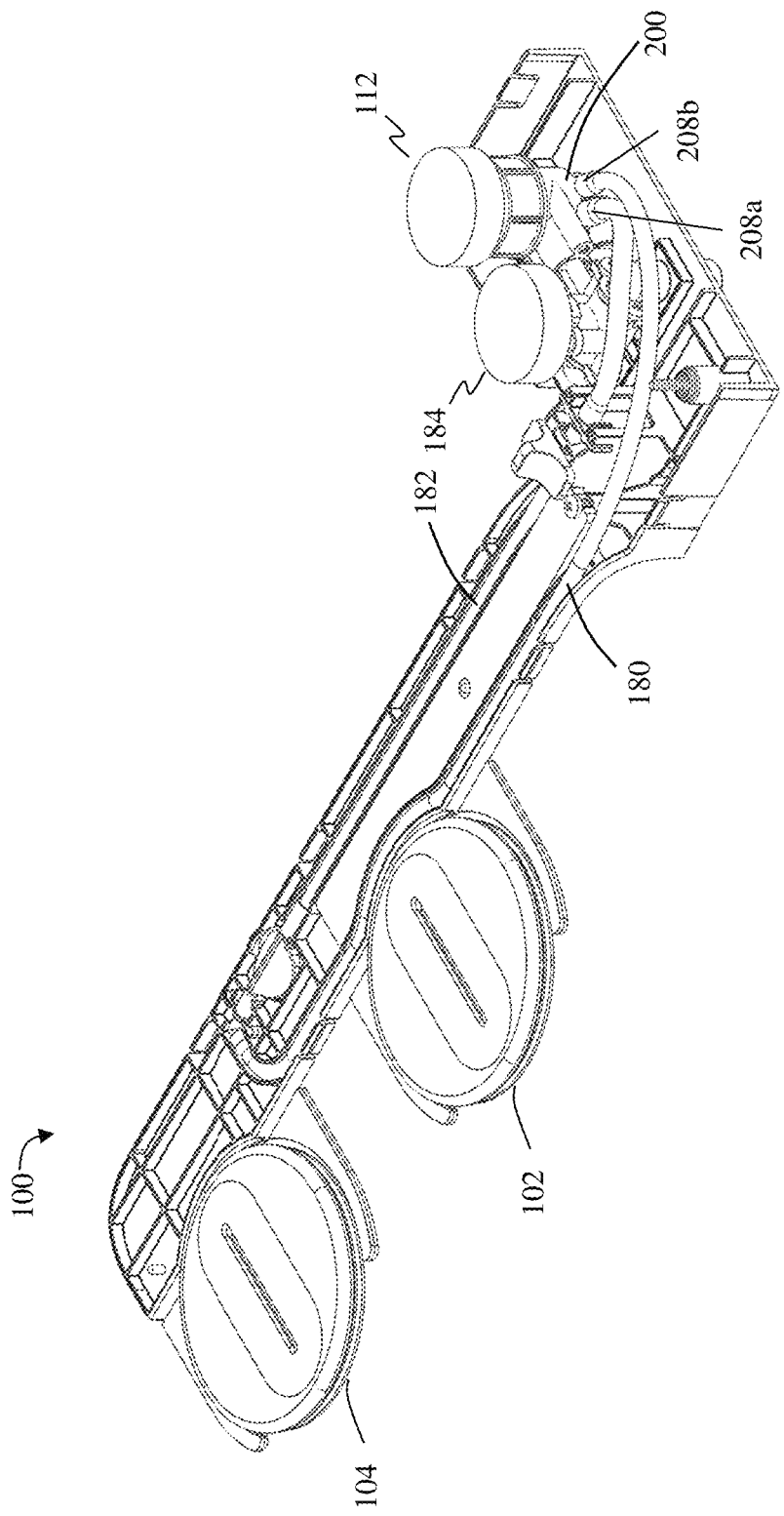
FIG. 22 is a top perspective view of a bidet attachment system including a multifunctional spray, shown with top cover removed, according to an example embodiment.
Figure 23:
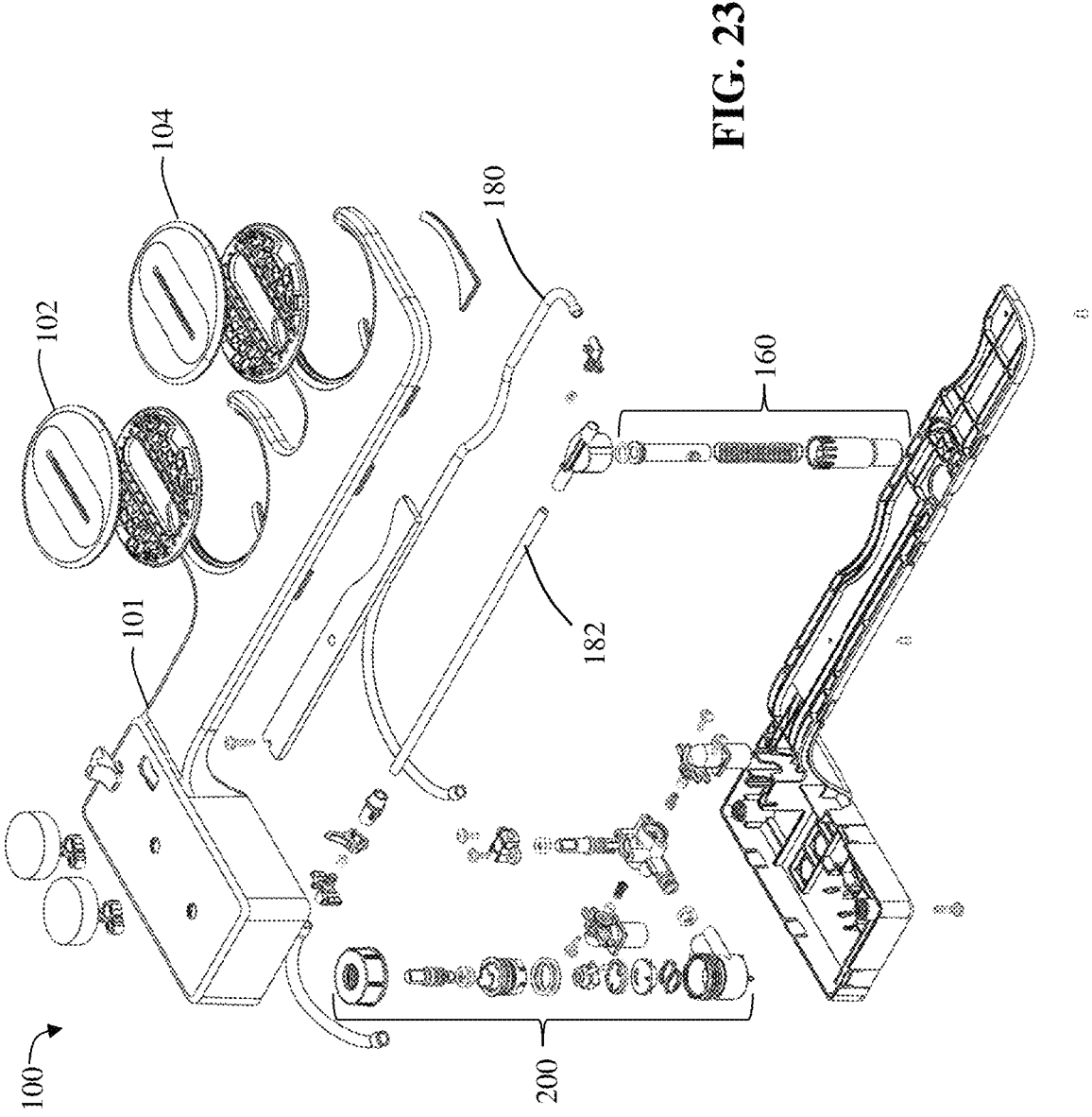
FIG. 23 is an exploded top perspective view of a bidet attachment system including a multifunctional spray, according to an example embodiment.

FIG. 22 is a top perspective view, and FIG. 23 is an exploded top perspective view, of a bidet attachment system 100 including a multifunctional spray, shown with top cover removed, according to an example embodiment. FIG. 22 shows that the outlet section 206 includes multiple outlet ports 208a-b that are configured to discharge the water into a pair of tubes 180, 182 towards a spray structure 160, discussed above. In this manner, the valve is in fluid communication with the spray structure 160 via tubes 180, 182. The use of two separate outlet ports 208a-b is effective for the egress of water through separate tubes 180, 182 to the spray structure 160 for two different purposes: self-cleaning and cleaning a user's body.

The claimed embodiments may be used with a variety of conventional toilets, allowing the placement of a bidet attachment system on toilets with bolt holes at different distances from one another, at different distances from the bowl of the toilet, and at different distances from the tank of the toilet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A bidet attachment system, comprising:
   an attachment structure configured for removable attachment to a toilet bowl;
   a spray structure configured for spraying water, the spray structure coupled to a bottom side of the attachment structure;
   a rotatable dial located on a top side of the attachment structure, the rotatable dial having a first position adjacent to a second position, and a third position adjacent to the second position;
   a valve comprising:
     a) an inlet section that allows for ingress of water;
     b) a valve section downstream of the inlet section, the valve section regulating passage of water from the inlet section;
     c) an outlet section downstream of the valve section, wherein the outlet section includes a first outlet that allows for egress of water and a second outlet that allows for egress of water;
     d) wherein the valve section includes: i) an adjustable control disc being mechanically coupled with the dial such that rotation of the dial rotates the control disc, the control disc having a first channel bore and a second channel bore; and ii) a stationary disc downstream from, and in contact with, the control disc, the stationary disc having a first channel bore providing access to the first outlet and a second channel bore providing access to the second outlet, and
     e) wherein when the dial is in the first position, the channel bores of the control disc and stationary disc do not align, and water does not pass from the inlet section to the outlet section;
     f) wherein when the dial is in the second position, the first channel bore of the control disc aligns with the first channel bore of the stationary disc and water passes from the inlet section to the first outlet in the outlet section;
     g) wherein when the dial is in the third position, the second channel bore of the control disc aligns with the second channel bore of the stationary disc and water passes from the inlet section to the second outlet in the outlet section.

2. The bidet attachment system of claim 1, wherein the attachment structure further comprises a planar element configured for removable attachment to a top of the toilet bowl via one or more fasteners.

3. The bidet attachment system of claim 2, wherein the spray structure further comprises a protrusion coupled to the bottom side of the attachment structure such that when the attachment structure is removably attached to the toilet bowl, the protrusion is located within the toilet bowl.

4. The bidet attachment system of claim 3, wherein the protrusion further comprises a cylindrical structure within which is located a retractable spout.

5. The bidet attachment system of claim 4, wherein the retractable spout is in a retracted position when water does not pass from the inlet section to the outlet section and wherein the retractable spout is in an extended position when water passes from the inlet section to the outlet section.

6. The bidet attachment system of claim 5, wherein the retractable spout further comprises a first orifice that sprays water when the water passes from the inlet section to the first outlet in the outlet section.

7. The bidet attachment system of claim 6, wherein the retractable spout further comprises a second orifice that sprays water when the water passes from the inlet section to the second outlet in the outlet section.

8. The bidet attachment system of claim 7, wherein the dial is rotated clockwise from the first position to the second position.

9. The bidet attachment system of claim 8, wherein the dial is rotated clockwise from the second position to the third position.

10. The bidet attachment system of claim 9, wherein the first outlet in the outlet section is communicably coupled with the first orifice in the retractable spout and wherein the second outlet in the outlet section is communicably coupled with the second orifice in the retractable spout.

11. A bidet attachment system, comprising:
    an attachment structure configured for removable attachment to a toilet bowl;
    a spray structure configured for spraying water, the spray structure coupled to a bottom side of the attachment structure;
    a water attachment structure configured for coupling the bidet attachment with a source of water;
    a rotatable dial located on a top side of the attachment structure, the rotatable dial having a first position adjacent to a second position, and a third position adjacent to the second position;

a valve comprising:
  a) an inlet section that allows for ingress of water;
  b) a valve section downstream of the inlet section, the valve section regulating passage of water from the inlet section;
  c) an outlet section downstream of the valve section, wherein the outlet section includes a first outlet that allows for egress of water and a second outlet that allows for egress of water;
  d) wherein the valve section includes: i) an adjustable control disc being mechanically coupled with the dial such that rotation of the dial rotates the control disc, the control disc having a first channel bore and a second channel bore; and ii) a stationary disc downstream from, and in contact with, the control disc, the stationary disc having a first channel bore providing access to the first outlet and a second channel bore providing access to the second outlet, and
  e) wherein when the dial is in the first position, the channel bores of the control disc and stationary disc do not align, and water does not pass from the inlet section to the outlet section;
  f) wherein when the dial is in the second position, the first channel bore of the control disc aligns with the first channel bore of the stationary disc and water passes from the inlet section to the first outlet in the outlet section;
  g) wherein when the dial is in the third position, the second channel bore of the control disc aligns with the second channel bore of the stationary disc and water passes from the inlet section to the second outlet in the outlet section.

12. The bidet attachment system of claim 11, wherein the attachment structure further comprises a planar element configured for removable attachment to a top of the toilet bowl via one or more fasteners.

13. The bidet attachment system of claim 12, wherein the spray structure further comprises a protrusion coupled to the bottom side of the attachment structure such that when the attachment structure is removably attached to the toilet bowl, the protrusion is located within the toilet bowl.

14. The bidet attachment system of claim 13, wherein the protrusion further comprises a cylindrical structure within which is located a retractable spout.

15. The bidet attachment system of claim 14, wherein the retractable spout is in a retracted position when water does not pass from the inlet section to the outlet section and wherein the retractable spout is in an extended position when water passes from the inlet section to the outlet section.

16. The bidet attachment system of claim 15, wherein the retractable spout further comprises a first orifice that sprays water when the water passes from the inlet section to the first outlet in the outlet section.

17. The bidet attachment system of claim 16, wherein the retractable spout further comprises a second orifice that sprays water when the water passes from the inlet section to the second outlet in the outlet section.

18. The bidet attachment system of claim 17, wherein the dial is rotated clockwise from the first position to the second position.

19. The bidet attachment system of claim 18, wherein the dial is rotated clockwise from the second position to the third position.

20. The bidet attachment system of claim 19, wherein the first outlet in the outlet section is communicably coupled with the first orifice in the retractable spout and wherein the second outlet in the outlet section is communicably coupled with the second orifice in the retractable spout.

\* \* \* \* \*